(12) United States Patent
Gallant et al.

(10) Patent No.: US 6,843,060 B2
(45) Date of Patent: Jan. 18, 2005

(54) FAULT MANAGEMENT SYSTEM FOR GAS TURBINE ENGINES

(75) Inventors: Steven Gallant, Ellington, CT (US); Raymond D. Zagranski, Somers, CT (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 200 days.

(21) Appl. No.: 10/293,130

(22) Filed: Nov. 13, 2002

(65) Prior Publication Data

US 2004/0088991 A1 May 13, 2004

Related U.S. Application Data

(60) Provisional application No. 60/350,709, filed on Nov. 13, 2001.

(51) Int. Cl.[7] .................................................. F02C 1/00
(52) U.S. Cl. ..................... 60/772; 60/773; 60/39.091; 60/793; 60/223
(58) Field of Search .................... 60/772, 773, 793, 60/223, 39.091

(56) References Cited

U.S. PATENT DOCUMENTS

| | | | | |
|---|---|---|---|---|
| 3,850,985 A | * | 11/1974 | Buchwald et al. | 562/871 |
| 4,249,238 A | * | 2/1981 | Spang et al. | 701/100 |
| 5,027,268 A | * | 6/1991 | Sakurai et al. | 700/79 |
| 5,161,158 A | | 11/1992 | Chakravarty et al. | |
| 5,710,723 A | * | 1/1998 | Hoth et al. | 702/181 |
| 5,877,692 A | * | 3/1999 | Watanabe et al. | 340/679 |
| 6,343,251 B1 | * | 1/2002 | Herron et al. | 701/100 |
| 6,490,543 B1 | * | 12/2002 | Jaw | 702/184 |
| 6,606,580 B1 | * | 8/2003 | Zedda et al. | 702/185 |
| 6,684,349 B2 | * | 1/2004 | Gullo et al. | 714/47 |
| 2002/0066054 A1 | * | 5/2002 | Jaw et al. | 714/48 |
| 2002/0087258 A1 | * | 7/2002 | Johnson | 701/114 |
| 2003/0120402 A1 | * | 6/2003 | Jaw | 701/29 |
| 2003/0195718 A1 | * | 10/2003 | Crowder | 702/183 |
| 2004/0049715 A1 | * | 3/2004 | Jaw | 714/43 |

FOREIGN PATENT DOCUMENTS

EP 0 541 326 A2 12/1993

OTHER PUBLICATIONS

Merrington et al., Fault detection and Diagnosis in Gas turbines, Transactiones of the ASME, vol. 113, Apr. 1991, pp. 276–282.*

SAE Publication entitled "Guidelines for Time–Limited––Dispatch (TLD) Analysis for Electronic Engine Control Systems," issued 1997.

U.S. Provisional patent application Ser. No. 60/350,709 filed Nov. 13, 2001.

Lloyd, F.H., Predicting Failures in Redundant Systems, Machine Design, Mar. 22, 1990, vol. 62, No. 6, pp. 105–108.

International Search Report dated Sep. 16, 2003.

* cited by examiner

Primary Examiner—Justine R. Yu
Assistant Examiner—William H. Rodriguez
(74) Attorney, Agent, or Firm—David J. Silvia; Edwards & Angell, LLP

(57) ABSTRACT

Disclosed herein is a "real time" Time Limited Dispatch (TLD) fault management system and method for evaluating the operational suitability of an engine's electronic control system. The TLD system disclosed herein uses a software algorithm to compute or predict the probability of mission success for a given upcoming mission length (e.g., two hours) and the time remaining to repair control system faults before dispatch is disallowed or the flight suspended, regardless of the probability of success.

22 Claims, 15 Drawing Sheets

Figure 5b

| | HBV | CJC | T4.5 | T1 | P1 | P3 | Start SW | S/O SW | WFTM DRV | IGVTM DRV | HBV DRV | Lamp S | XENG Dat Link | PS | CPU | XCHAN Dat Link |
|---|---|---|---|---|---|---|---|---|---|---|---|---|---|---|---|---|
| | | | | | | | | | | | | | | X | X | X |
| | | | | | | | | | | | | | | X | X | X |
| | | | | | | | | | | | | | | X | X | X |
| | | | | | | | | | | | | | | X | X | X |
| | | | | | | | | | | | | | | X | X | X |
| | X | | | | | | | | | | | | | X | X | X |
| | | X | | | | | | | | | | | | X | X | X |
| | | | X | | | | | | | | | | | X | X | X |
| | | | | X | | | | | | | | | | X | X | X |
| | | | | | X | | | | | | | | | X | X | X |
| | | | | | | X | | | | | | | | X | X | X |
| | | | | | | | X | | | | | | | X | X | X |
| | | | | | | | | X | | | | | | X | X | X |
| | | | | | | | | | X | | | | | X | X | X |
| | | | | | | | | | | X | | | | X | X | X |
| | | | | | | | | | | | X | | | X | X | X |
| | | | | | | | | | | | | | X | X | X | X |
| | X | X | X | X | X | X | X | X | X | X | X | X | X | X | X | X |
| | X | X | X | X | X | X | X | X | X | X | X | X | X | X | X | X |
| | X | X | X | X | X | X | X | X | X | X | X | X | X | X | X | X |

FAULT MANAGEMENT SYSTEM FOR GAS TURBINE ENGINES

CROSS-REFERENCE TO RELATED APPLICATIONS

This application claims priority to U.S. Provisional Patent Application No. 60/350,709, filed Nov. 13, 2001, entitled "Aircraft Fault Management System," which is herein incorporated by reference in its entirety to the extent that it is not inconsistent with this disclosure.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject disclosure relates to a control system for use with aircraft gas turbine engines, and more particularly to, a control system which includes a "real-time" Time Limited Dispatch fault management system which evaluates engine electronic component failures and determines the allowable engine operational running time with failures present in the control system based on predicted component failure rates.

2. Background of the Related Art

Often aircraft engine control systems have redundant components or elements to improve flight safety or for increasing the operational running time between maintenance periods. In engine control systems which have redundant components or elements, Time Limited Dispatch (TLD) methodologies are applied to evaluate whether an engine can continue to operate for a predetermined length of time with faults present in the redundant components/elements, before repairs are required. More specifically, the TLD methodologies are a means for substantiating and obtaining approval for dispatching and operating a Full Authority Digital Engine Control (FADEC) equipped aircraft, for limited time periods, with faults present in the system, after which, appropriate repairs shall be made to bring the system to the "full up" configuration. The term "full up" is used to indicate that the FADEC system is free of faults which affect the loss of thrust control (LOTC) failure rate.

The FADEC system controls the operation of the engine over an entire performance range, usually from engine start-up to maximum power or thrust. The FADEC system consists generally of an electronic engine control (EEC) unit, a fuel metering unit (i.e. hydromechanical control unit), sensors, actuators, valves, an alternator and interconnecting electrical harnesses. FIG. 1b provides a schematic representation of a typical FADEC system for a dual channel EEC unit.

In multiengine aircraft, TLD methodologies are applied independently to each engine when determining the allowable operating time (i.e., dispatch service time). Thus the aircraft could be dispatched with faults present in more than one engine's FADEC system.

SAE, the engineering society for advancing mobility on land, sea, air and space, publishes aerospace recommended practice (ARP) 5107 which provides methodologies and approaches which are presently used for conducting and documenting the analysis associated with the application of TLD to FADEC systems. Traditionally, under the SAE approach, maintenance or dispatch crews are required to perform a multitude of calculations on the ground to determine if the aircraft can be dispatched for a particular mission. This approach is performed while the aircraft is on the ground, is often very time consuming, and results in a less than optimal maintenance schedule.

There is a need therefore, for a fault management system which is integrated with the aircraft's control system and is capable of analyzing fault scenarios in "real-time" so as to assist pilots or maintenance personnel in making intelligent decisions on the dispatch capability of the aircraft.

SUMMARY OF THE INVENTION

The disclosure of the present application relates to a "real time" Time Limited Dispatch (TLD) fault management system for use in evaluating the operational suitability of an engine's FADEC system. The TLD system disclosed herein uses a software algorithm to compute the probability of mission success for a given upcoming mission length (e.g., two hours) and compares this probability with the ARP 5107 and FAA guidelines for dispatch. It also computes the time remaining to repair control system faults before dispatch is disallowed, regardless of the probability of success.

The subject disclosure is also directed to a fault management method for use with a dual channel electronic engine control system. The fault management method disclosed herein includes the steps of; providing an electronic engine control system having a first channel and a second channel, designating, for each of the plurality of components in the first channel, which of the plurality of components in the second channel are single thread components required to cover a failure of that particular first channel component; and detecting whether any one of the plurality of components in the first channel have failed.

Each of the first and second channels has a plurality of components associated therewith, each having a predicted failure rate. Additionally, the components in the second channel are substantially identical to the components in the first channel.

The method further includes the steps of; estimating a total failure rate based on the failure rates for all of the single thread components required to cover any failed components; and predicting the time remaining to fix the electronic control system faults based on the total failure rate.

Preferably, the step of estimating a total failure rate based on the failure rates for all of the single thread components includes summing the failure rates for all of the single thread components and failure rates for common prime reliable components. Additionally, in a representative embodiment of the method, the step of predicting the time remaining to fix the electronic control system faults based on the total failure rate includes the step of assigning a desired probability for maintaining normal engine control.

It is presently envisioned that the fault management method disclosed herein may further include the steps of; establishing an estimated mission length; comparing the estimated mission length to the predicted time remaining to fix the system faults; and providing an go/no-go signal based on the comparison of the time remaining to fix the electronic control system faults to estimated mission length.

In an alternative embodiment, the fault management method of the present invention further includes the steps of; detecting whether any of single thread components in the second channel have failed; and providing a no-go signal if a single thread component in the second channel has failed.

Still further, the fault management method may further include the steps of; estimating a probability of mission success based on the total failure rate; assigning a minimum probability of success for the mission; and providing a no-go signal if the estimated probability of mission success does not exceed the assigned minimum probability of success.

Prior to predicting based on the total failure rate the time remaining to fix the electronic control system faults, the method disclosed herein may further include the steps of; designating for each of the plurality of components in the second channel which of the plurality of components in the first channel are single thread components required to cover a failure of that particular second channel component and maintain normal engine control; detecting which of the plurality of components in the second channel have failed; and estimating the total failure rate based on the failure rates for all of the single thread components in the first and second channels which are required to cover the failed first and second channel components.

It is further envisioned that the steps of detecting which of the plurality of components in the first channel have failed; estimating a total failure rate based on the failure rates for all of the single thread components in the second channel which are required to cover the failed first channel component; and predicting based on the total failure rate the time remaining to fix the electronic control system faults are iteratively preformed.

The present disclosure is also directed to a fault management model for a dual channel electronic engine control system. The fault management model disclosed herein including, among other things, an electronic engine control system having a first channel and a second channel, a mechanism for designating for each of the plurality of components in the first channel which of the plurality of components in the second channel are single thread components required to cover a failure of that particular first channel component; and a mechanism for detecting whether any of the plurality of components in the first channel have failed. The first and second channels of the electronic control system have a plurality of components associated therewith each having an assigned failure rate. Additionally, the components in the second channel are substantially identical to the components in the first channel;

The fault management model further includes a mechanism for estimating a total failure rate based on the failure rates for all of the single thread components required to cover any failed components; and a device for predicting the time remaining to fix the electronic control system faults based on the total failure rate.

In a preferred embodiment, the mechanism for estimating a total failure rate based on the failure rates for all of the single thread components includes a system for summing the failure rates for all of the single thread components and failure rates for common prime reliable components.

It is presently envisioned that the device for predicting based on the total failure rate the time remaining to fix the electronic control system faults includes mechanism for assigning a desired probability for maintaining normal engine control.

In a representative embodiment, the fault management model further includes a mechanism for establishing an estimated mission length; means for comparing the estimated mission length to the predicted time remaining to fix the system faults; and a device for providing a go/no-go signal based on the comparison of the time remaining to fix the electronic control system faults to estimated mission length.

Alternative embodiments of the fault management model may further include a mechanism for detecting whether any of the single thread components in the second channel have failed; and a device for providing a no-go signal if a single thread component in the second channel has failed.

A still further embodiment of the present invention includes a means for estimating a probability of mission success based on the total failure rate; a mechanism for assigning a minimum probability of success for the mission; and a device for providing a no-go signal if the estimated probability of mission success does not exceed the assigned minimum probability of success.

A mechanism for designating for each of the plurality of components in the second channel which of the plurality of components in the first channel are single thread components required to cover a failure of that particular second channel component may be further included in the model of the present application. Additionally, in this embodiment it is envisioned that the model further includes a mechanism for detecting whether any of the plurality of components in the second channel have failed; and means for estimating the total failure rate based on the failure rates for all of the single thread components in the first and second channels which are required to cover the failed first and second channel components.

The present disclosure is also directed to a fault management method for electronic engine control systems. The disclosed method includes the steps of; providing an electronic engine control system having a first plurality of components for normal engine control and second plurality of components which are substantially redundant to the first plurality of components, designating for each of the first plurality of components which of the second plurality of components are single thread components required to cover a failure of that particular first component; and iteratively detecting whether any of the first plurality of components have failed. Each of the first and second plurality of components has an assigned failure rate.

It is further envisioned that the disclosed method includes the steps of; iteratively estimating a total failure rate based on the failure rates for all of the single thread components required to cover the failed first plurality of components; and iteratively predicting the time remaining to fix the electronic control system failure based on the total failure rate.

The fault management system of the subject application analyzes, in real-time, electronic control system fault scenarios and helps pilots and maintenance personnel make intelligent decisions on the dispatch capability of aircraft. It also allows maintenance to be scheduled appropriately, thereby lowering the operating cost of the aircraft.

BRIEF DESCRIPTION OF THE DRAWINGS

So that those having ordinary skill in the art to which the present application appertains will more readily understand how to make and use the same, reference may be had to the drawings wherein:

FIGS. 5a–5b illustrate a TLD failure matrix for a Dual Channel FADEC system which identifies the single-thread components required to cover a failure of a particular component;

These and other features of the subject disclosure will become more readily apparent to those having ordinary skill in the art from the following detailed description of preferred embodiments.

DETAILED DESCRIPTION OF PREFERRED EMBODIMENTS

Figure 1A:
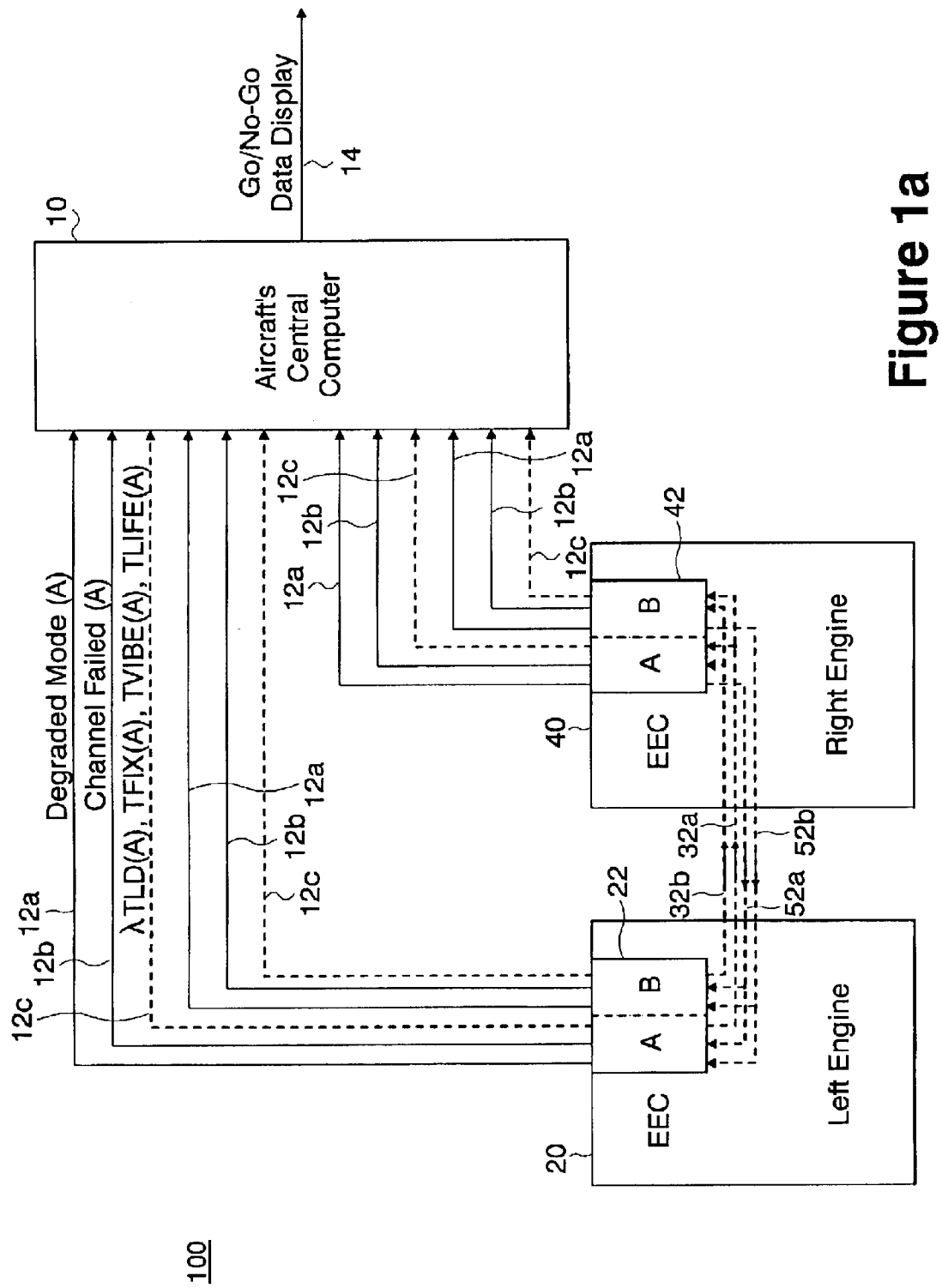
FIG. 1a is a schematic representation of a dual engine fault management system which includes left and right electronic engine control units interfacing with an aircraft computer.

Referring now to the drawings wherein like reference numerals identify similar elements of the subject invention there is illustrated in FIG. 1a a schematic representation of a fault management system designated generally by reference numeral 100. Portions of fault management system 100 reside in the aircraft's central computer 10, the Full Authority Digital Engine Control (FADEC) system 20 associated with the left engine and the FADEC system 40 associated with the right engine.

Figure 1B:
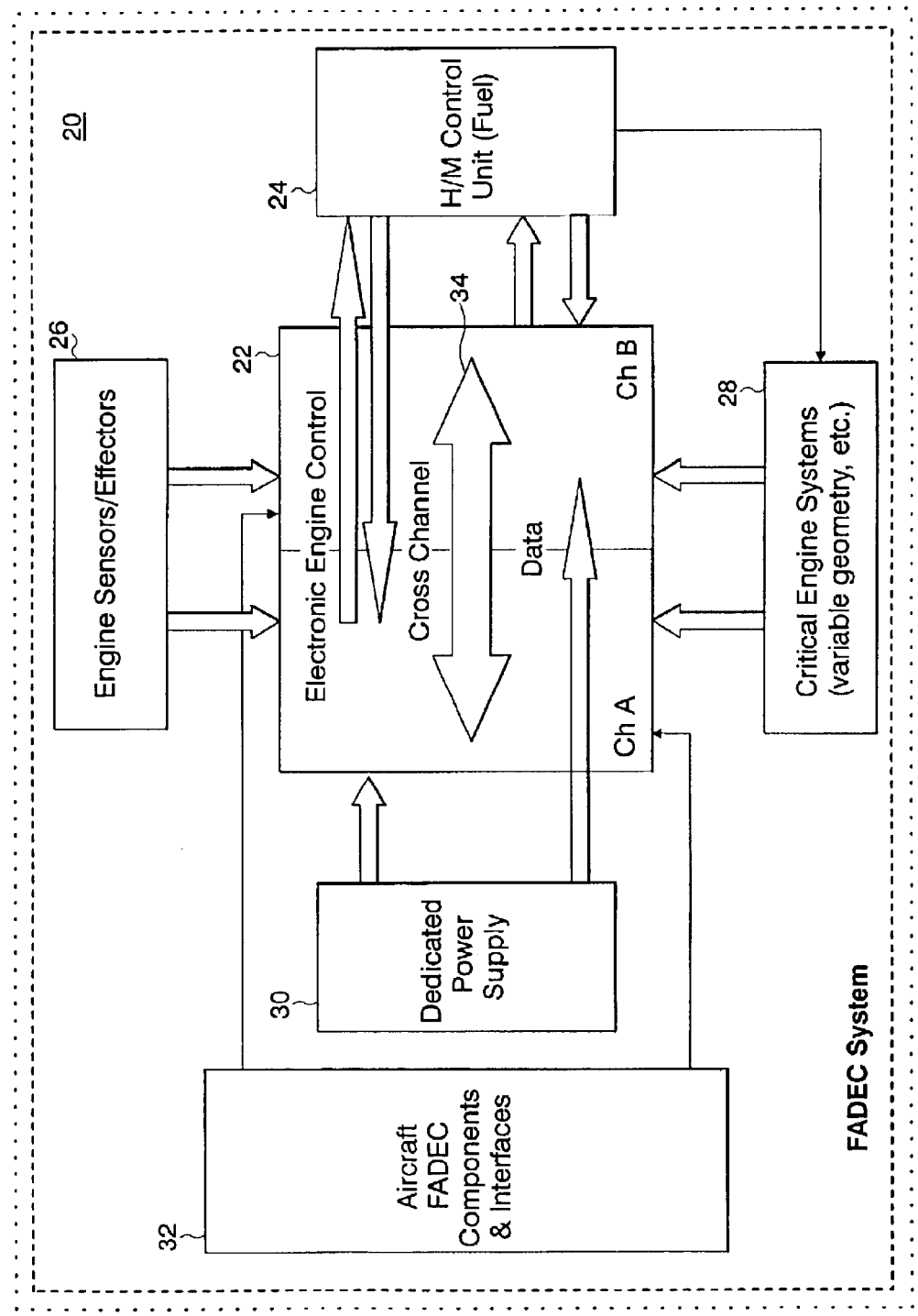
FIG. 1b is a schematic representation of a simplified FADEC system.

FADEC systems 20 and 40 control the operation of the left and right engines, respectively, over an entire performance range, usually from engine start to maximum power or thrust. FIG. 1b schematically illustrates representative FADEC system 20 which consists of, among other things, an electronic engine control (EEC) unit 22, a fuel metering unit (i.e., hydromechanical control unit) 24, engine sensors 26, critical engine systems (effectors, etc.) 28, a dedicated power supply 30 and FADEC components and interfaces 32. FADEC systems 20 and 40 are dual-channel systems, i.e., each EEC unit 22 and 42 includes two redundant channels, a first channel A and a second redundant channel B. Channels A and B consist of identical components and provide redundancy in the engine control and operation, and enhance the dispatch capability of the aircraft.

FIG. 1a illustrates the communication interfaces that exist between EEC unit 22 and EEC unit 42 and between the EEC units 22 and 42, and the aircraft computer 10. This figure is not intended to limit or dictate the number of interfaces that can exist between the components of fault management system 100, but is merely a representative embodiment of the aspects of the present invention used for illustrative purposes.

Left engine EEC unit 22 communicates with the right engine EEC unit 42 through digital data links 32a and 32b. Digital data link 32a allows channel A of EEC unit 22 to communicate with channels A and B of EEC unit 42. In a similar manner, channel B of EEC unit 22 and channels A and B of EEC unit 42 communicate through data links 32a, 42a and 42b with the other channels in the system. As will be discussed in detail hereinbelow, the cross channel data links 32a, 32b, 42a and 42b enable the aircraft FADEC systems 20 and 40 to communicate and exchange data for use in engine operation and control. This becomes particularly important when components within a FADEC system fail and the other FADEC system must be relied upon to provide engine control through its complementary or redundant components.

Figure 3:
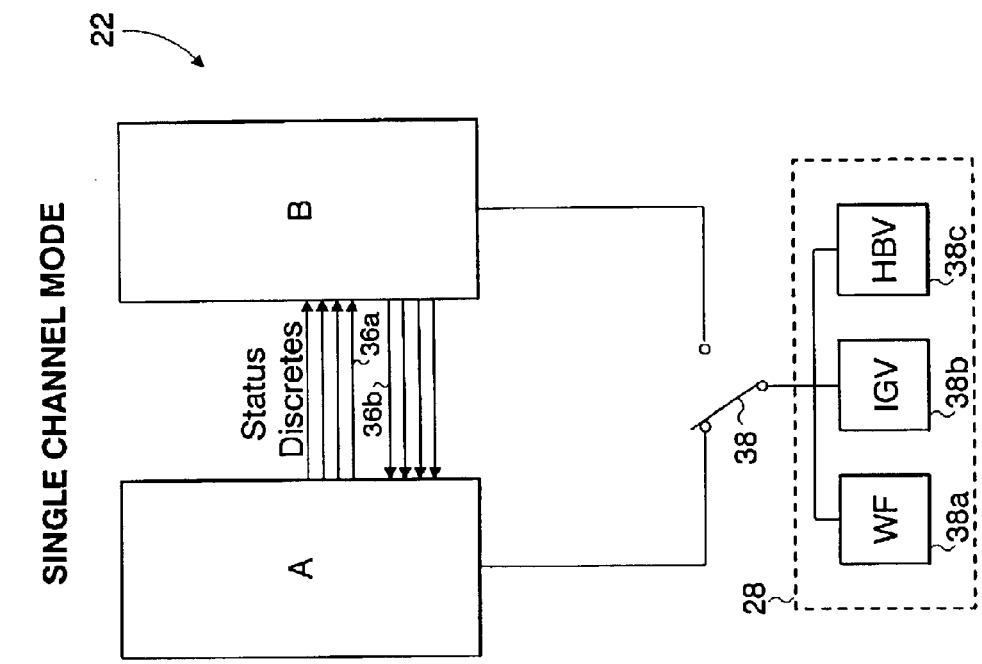
FIG. 3 is a schematic representation of the control system of FIG. 2, operating in the single channel mode wherein channel A is active and controls the fuel flow (WF), the inlet guide vane angle (IGV) and the bleed valve position (HBV)
Figure 2:
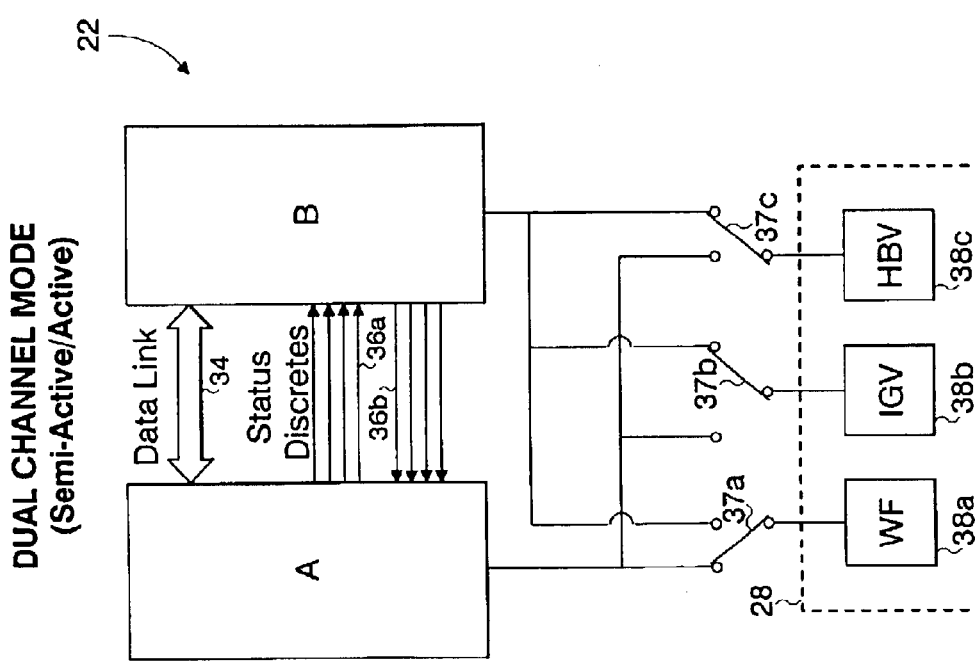
FIG. 2 is a schematic representation of a control system operating in the Dual Channel mode.

As shown in FIG. 1b, channels A and B within EEC unit 22 also communicate with each other through cross channel data link 34 and status discretes 36a and 36b (FIGS. 2 and 3). FIGS. 2 and 3 represent two operating conditions within EEC unit 22. In FIG. 2 the cross channel data link 34 is intact and therefore channel A can communicate and exchange data with channel B. As a result, either channel can control critical engine effectors 28. Shown herein, the effectors 28 consist of the amount of fuel flow (WF), the inlet guide vane angle (IGV), and the bleed valve position (HBV). Those skilled in the art will readily appreciate that EEC unit 22 as shown in FIG. 2 can control other critical engine systems.

Since cross channel data link 34 is intact, the control of the engine effectors 28 can be distributed, if necessary due to a component failure, between the channels to enhance dispatch capability. In FIG. 2, components within channel A or B have failed and therefore, switch 37a is positioned such that channel A controls WF 38a and switches 37b and 37c are positioned such that channel B controls IGV 38b and HBV 38c.

In FIG. 3, the cross channel data link has failed and the status discretes 36a and 36b determine which channel is in control or "active". The control of engine effectors 28 is dedicated to the active channel. As shown in this figure, switch 38 is positioned such that channel A is active and controls all engine effectors 28.

Referring again to FIG. 1a, wherein each channel in EEC unit 22 is shown communicating with the aircraft's central computer 10 through hardwired connections 12a and 12b and digital data link 12c. In a representative embodiment, hardwired connection 12a provides to the aircraft computer 10 the degradation mode of the channel's components and hardwired connection 12b identifies whether the channel has failed. Digital data link 12c provides to aircraft's central computer 10 fault management data. The fault management data can include for example, the failure rate of all the healthy "single thread" components in the dual channel system that are needed for normal mode operation ($\lambda_{TLD}$), the time remaining to fix the FADEC system faults ($T_{FIX}$), the time remaining to probable engine mechanical failure ($T_{VIBE}$), and the time remaining to cycle count exceedance (time left at contingency power) ($T_{LIFE}$). The system and method for determining $\lambda_{TLD}$, $T_{FIX}$, $T_{VIBE}$, and $T_{LIFE}$ will be described in detail hereinbelow with respect to FIGS. 4 through 8. The output signal 14 from aircraft computer 10 and fault management system 100 is provided to a go/no-go data display in the cockpit (not shown) which indicates whether the aircraft can satisfactorily complete the intended mission.

Figure 4A:
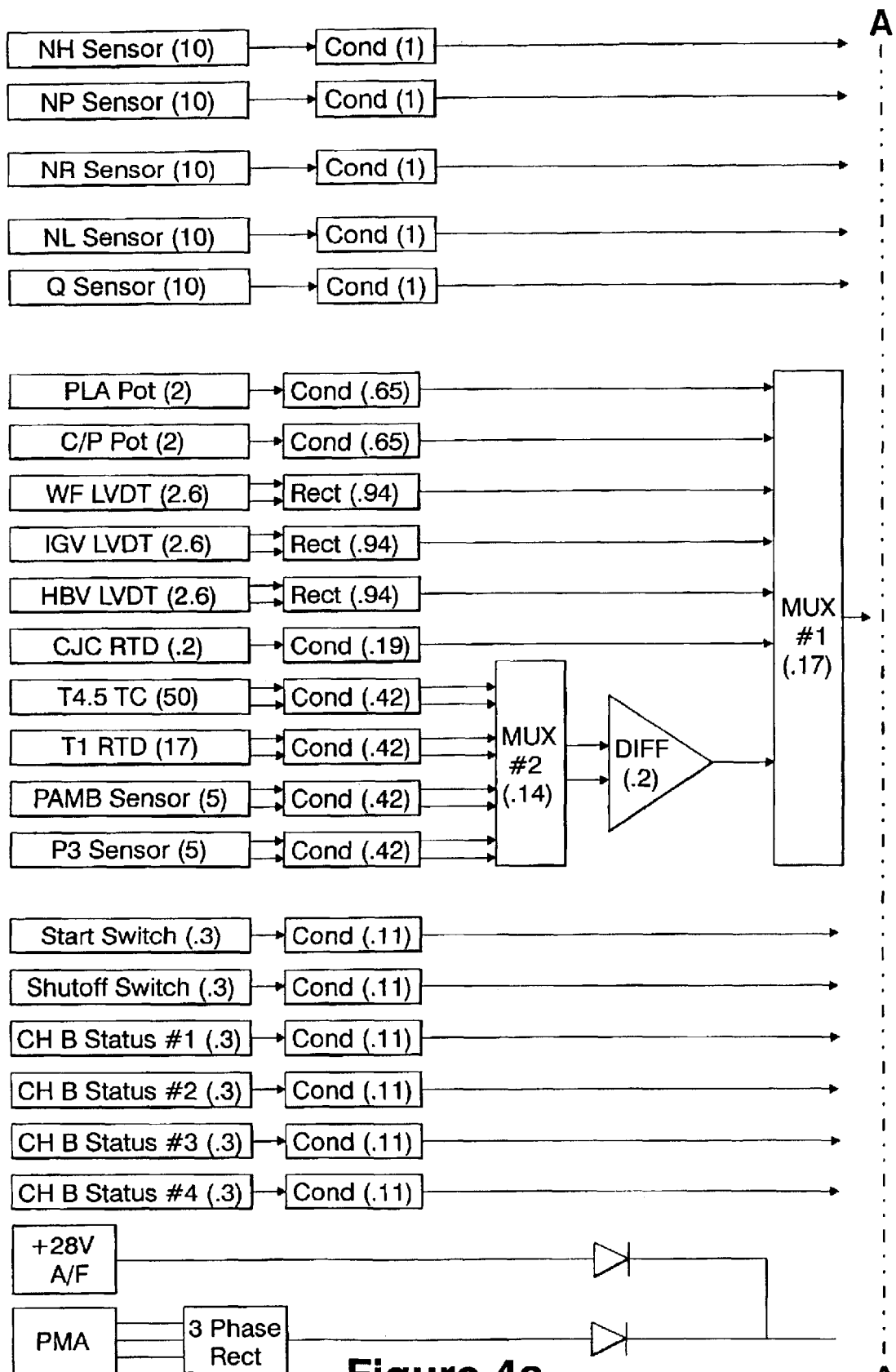
FIGS. 4a–4c provide a hardware diagram for Channel A which illustrates the essential equipment for dispatch in the "normal" mode.
Figure 4B:
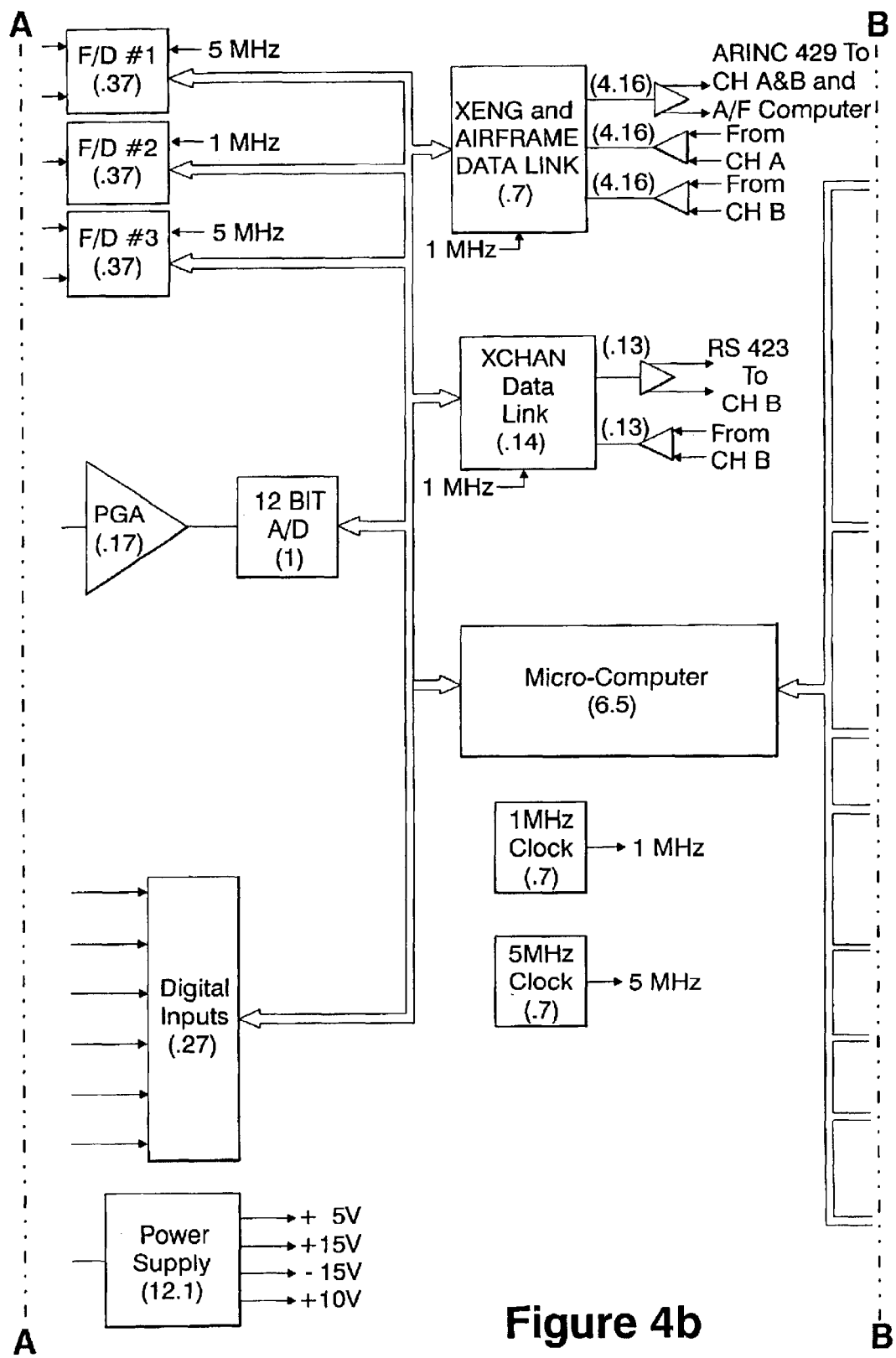
Figure 4C:
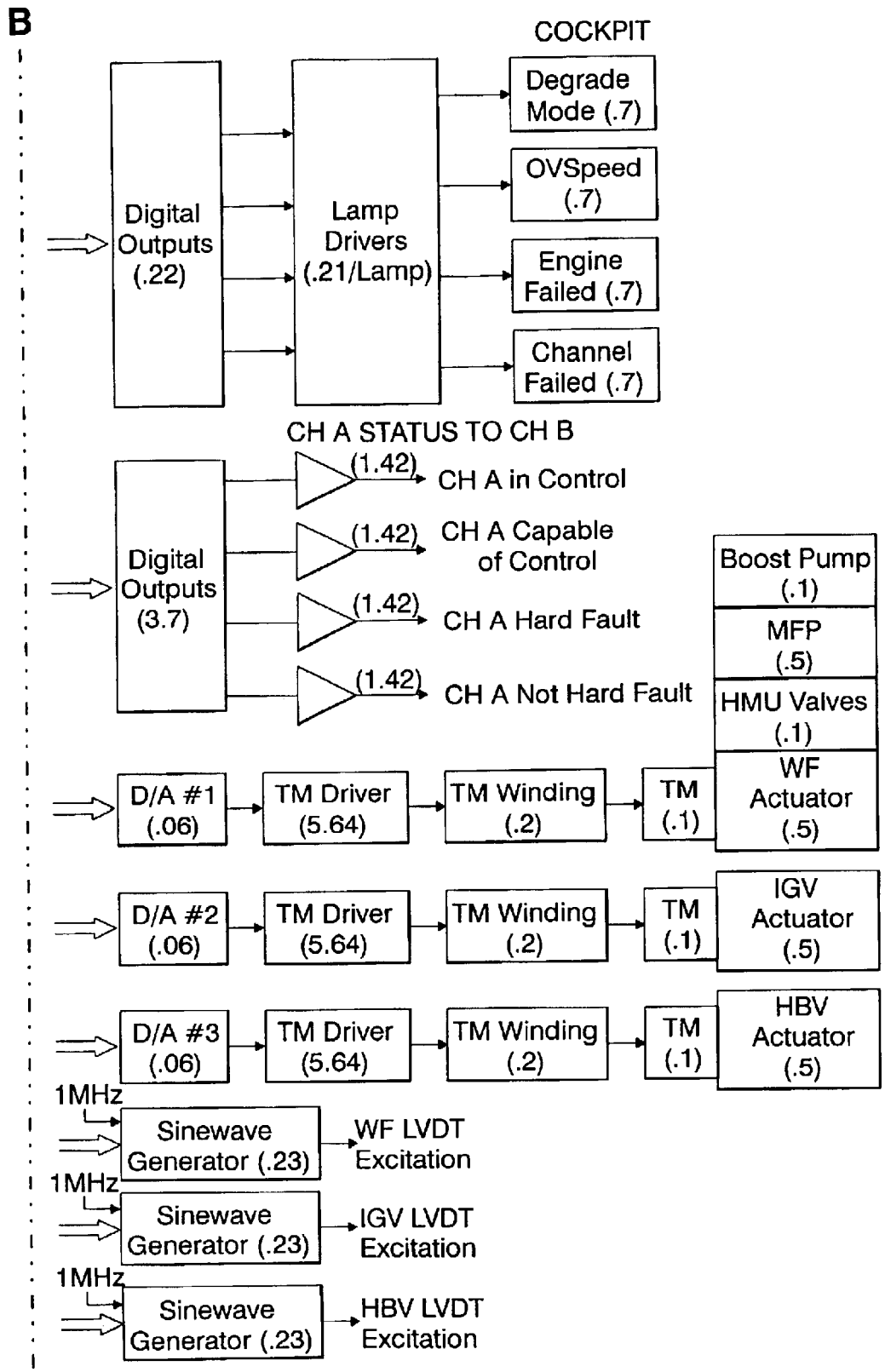

Referring now to FIGS. 4a–4c, there is shown a schematic representation of the FADEC system electronic components that are essential to engine operation in the "normal" mode. Normal mode is defined as being able to control the engine operation over the entire performance range, from engine start-up to maximum power or thrust. Identified adjacent to each component is a predicted failure rate of the component per million hours of operation. These figures represents the components of channel A in a dual channel FADEC system. The list of components for channel B would be identical. The failure rates or probabilities are typically provided by the component manufacturer and will be used as described hereinbelow in fault management system 100 for evaluating whether the engine can operate for a predetermined length of time with faults present in the redundant elements, before repairs are required.

The schematic diagram of FIGS. 4a–4c is illustrative of one representative FADEC system configuration and is not intended to be limiting as to the "essential" components, the relationship and intercommunication between the components or the failure rates assigned to each component. Components can be added or removed from the essential component list and the failure rates can be adjusted based on experience or testing.

The following is an index that provides a description for the acronyms and abbreviations used in FIGS. 4 through 6:

| | |
|---|---|
| NH | High Pressure Turbine Spool Speed |
| NP | Power Turbine Spool Speed |
| NR | Rotor Speed |
| NL | Low Pressure Turbine Spool Speed |
| Q | Engine Torque |
| Cond. | Conditioning Amplifiers |
| F/D | Frequency to Digital Converter |
| PLA | Power Level Angle |
| C/P | Collective Pitch |
| POT | Potentiometer |
| WF | Fuel Flow |
| IGV | Inlet Guide Vane Angle |
| HBV | Bleed Valve Position |
| LVDT | Linear Variable Differential Transformers |
| CJC | Cold Junction Compensation |
| RTD | Resistive Temperature Device |
| T4.5 | Power Turbine Inlet Gas Temperature |
| T1 | Compressor Air Inlet Temperature |
| TC | Theremocouple |
| PAMB | Pressure Ambient |
| P3 | Compressor Discharge Pressure |
| XENG | Cross Engine |
| XCHAN | Cross Channel |
| PGA | Programmable Gain Amplifier |
| RECT | Rectifiers |
| MUX | Multiplexers |
| D/A | Digital to Analog Converter |
| A/D | Analog to Digital Converter |
| TM | Torque Motor |
| MFP | Main Fuel Pump |
| HMU | Hydromechanical Unit |
| A/F | Airframe |
| PMA | Permanent Magnet Alternator |
| CH | Channel |
| S/O | Shutoff |
| ARINC | Aeronautical Radio, Inc. |
| DIFF | Differential |

FIGS. 4a–4c provide a schematic illustration of the interconnection and communication between the electronic components in channel A. The 1 and 5 MHz clocks are real time clocks that are used for various conversions. ARINC 429 is a data bus link which provides a communication link between channel A and the aircraft's central computer and cross-engine communication with the both channels. RS 423 is a serial data link which provides the cross channel data link between channels A and B.

Figure 5A:
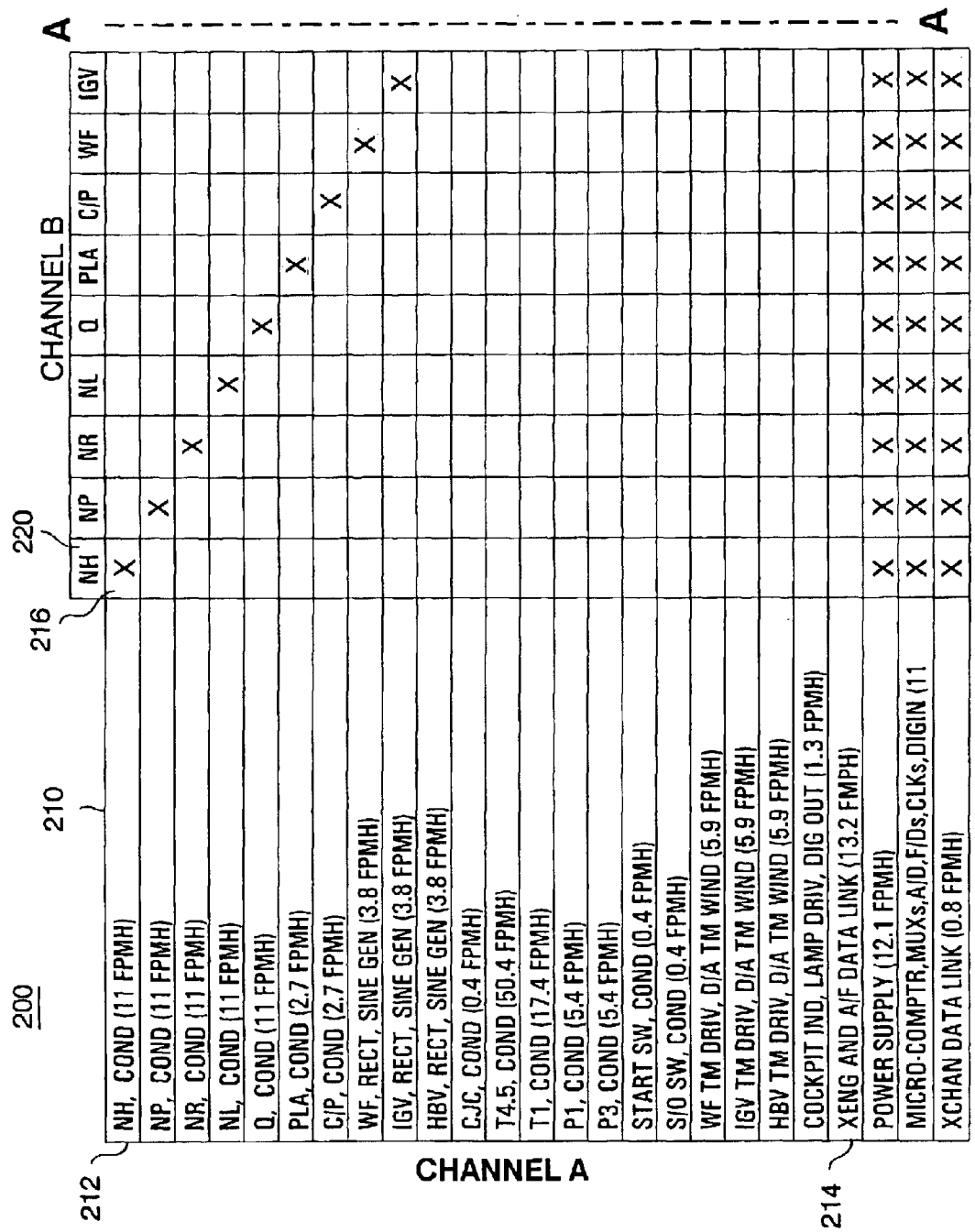

Referring now to FIGS. 5a–5b, which provide a TLD failure matrix 200 that lists in the first column 210 all channel A essential components and in the first row 220, all of the channel B essential components. An "X" in a row denotes the single-thread components required to compensate for a failure of a particular component. For example, if the high pressure turbine spool speed sensor for channel A fails (NH(A)), then the high pressure turbine spool speed sensor for channel B (NH(B)), CPU(B), PS(B) and the XCHAN data link are required to be operational, as denoted by an "X" in cells 216, 222, 218, and 224, respectively. In matrix 200, CPU(B) has been defined as the combination of the microcompute, the multiplexers, A/D, F/Ds, the clocks and the digital input from FIGS. 4a–4c. More specifically, if NH(A) fails, in order to continue operating in the normal mode, cross channel communication must be intact, the redundant component NH(B) must be operational, and the computer (CPU) and power supply for channel B must be online.

For the purposes of simplifying the failure analysis many of the essential components and their assigned failure rates have been grouped together. This provides a conservative approach to the failure analysis that minimizes computer-processing time. For example, in cell 212, NH(A) has been grouped with the associated conditioning circuit (see FIGS. 4a–4c) for a combined failure rate of 11 failures per million hours. Similarly, in cell 214, the XENG and Airframe data links have been grouped with the three buffers (signal to channel A and channel B, signal from channel A, and signal from channel B) for a combined failure rate of 13.2 (0.7+ 4.16+4.16+4.16≈13.2) failures per million hours.

Figure 6A:
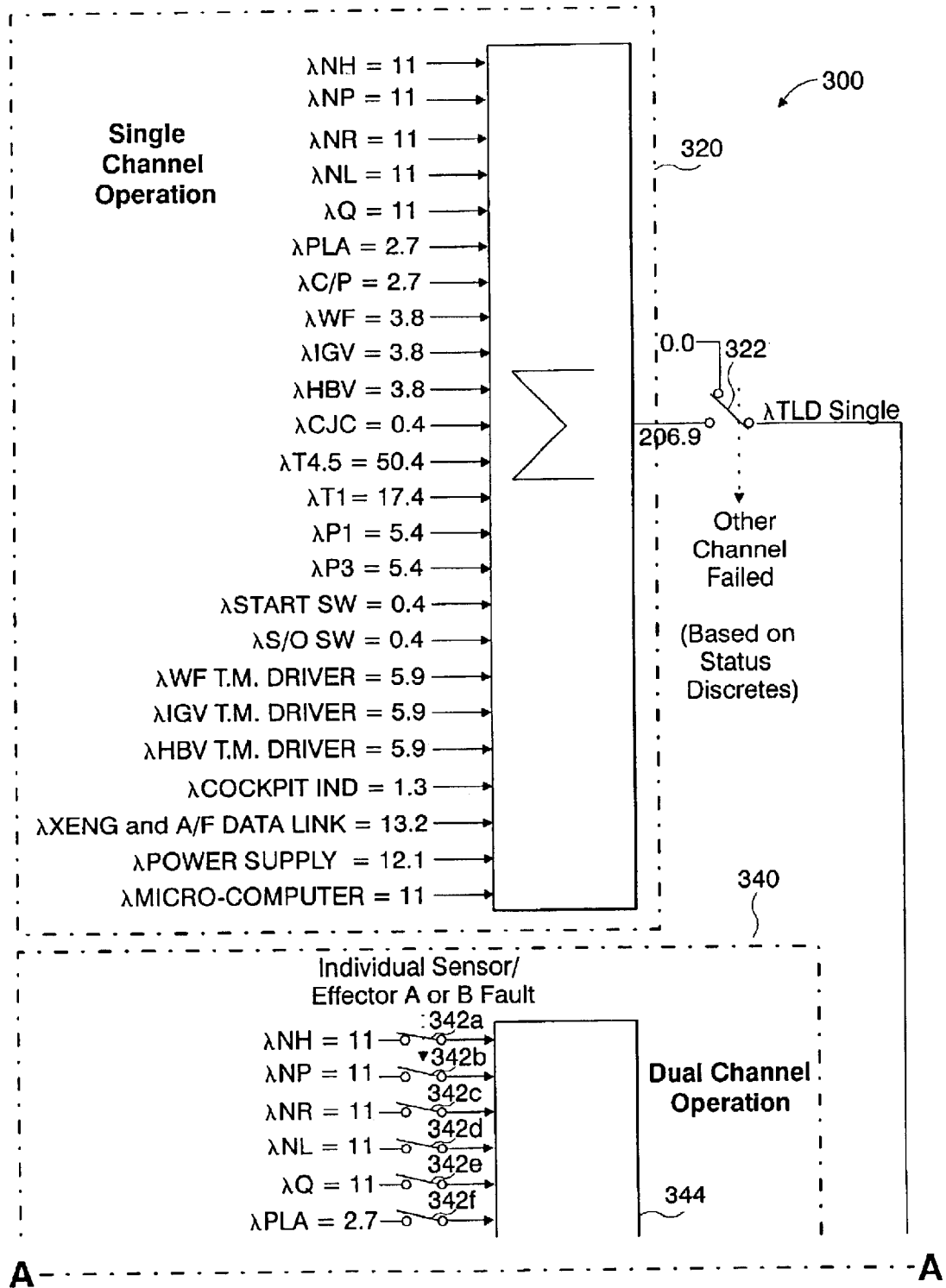
FIGS. 6a–6b provide a schematic representation of the FADEC system operating in the normal mode wherein the TLD failure rate ($\lambda_{TLD}$) is determined in failures per million hours for all of the single-thread components in the dual channel system that are necessary for "normal" mode operation.
Figure 6B:
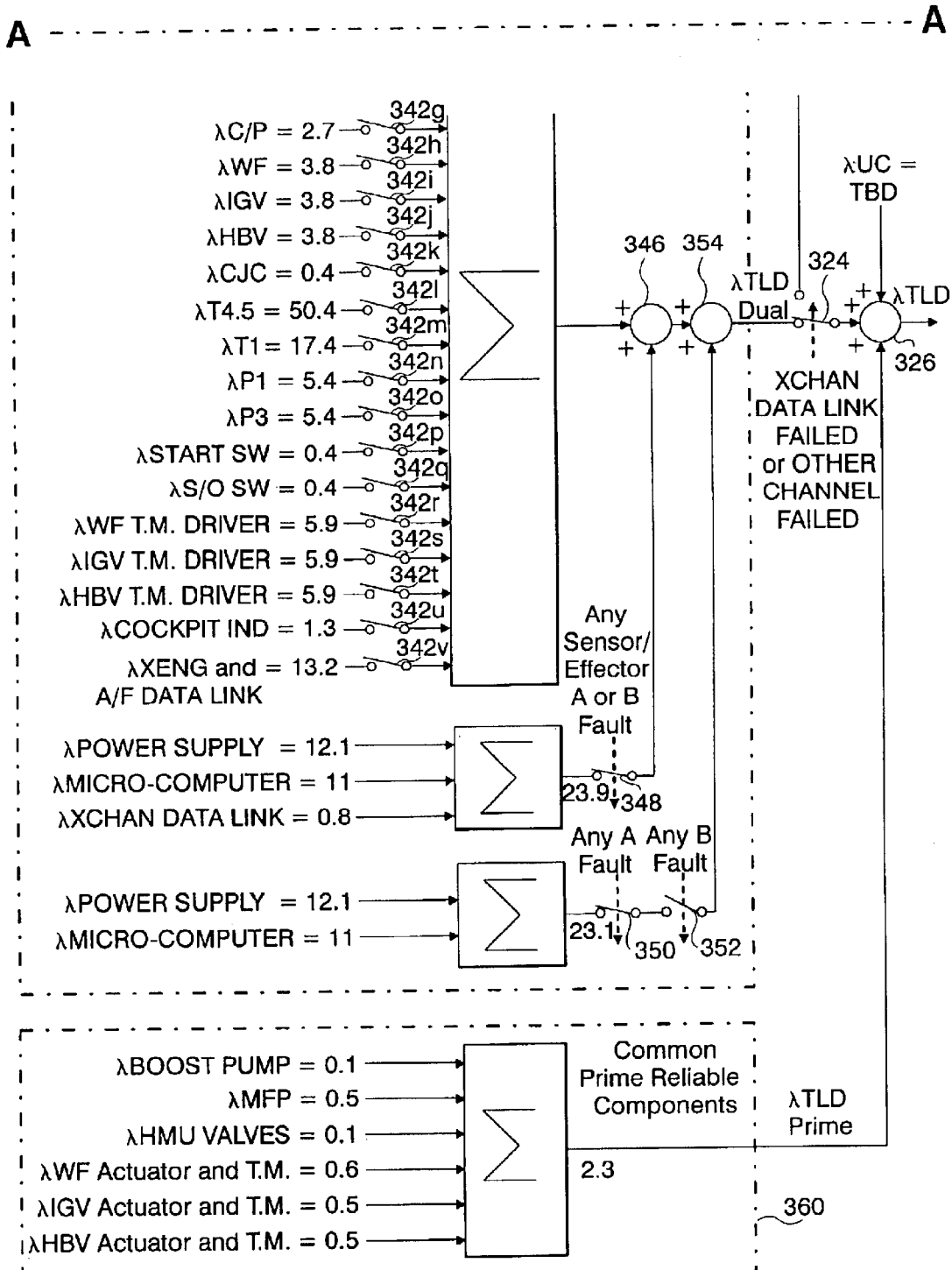

Referring now to FIGS. 6a–6b, there is illustrated a failure tree designated generally as reference numeral 300. Failure tree 300 is a representation of the TLD fault or failure management approach illustrated in matrix 200 of FIGS. 5a–5b. The essential components for single channel and dual channel operation are provided in regions 320 and 340 of failure tree 300. Common prime reliable components, such as the boost stage pump and main fuel pump are grouped in region 360.

If a channel has failed based on the data from the status discretes, switches 322 and 324 move in the direction of the dashed arrows and the engine's FADEC system is operating in the single channel mode defined in region 320. In this mode, the FADEC system has a single channel failure rate ($\lambda_{TLD\ single}$) of 206.9 fpmh. The single channel failure rate equals the total failure rate of all of the healthy single thread components in region 320.

A signal representing $\lambda_{TLD.single}$ is added to signals representing the uncovered fault failure rate ($\lambda_{UC}$) and the failure rate for the common prime reliable components ($\lambda_{TLD.prime}$) at summing junction 326. The method for determining $\lambda_{uc}$ is outlined in Section 7 of SAE Aerospace Recommended Practice 5107, which is herein incorporated by reference. The $\lambda_{uc}$ can be approximated by the following formula:

$$\lambda_{UC} = X^*(2.0^*\Sigma\lambda_{TLD.single})$$

X is generally between 0 and 0.05

For the purpose of simplifying the example calculations to follow, $\lambda_{uc}$ will be ignored (X=0, therefore, $\lambda_{uc}$=0).

The output of summing junction 326 is the failure rate of all of the healthy "single thread" components in the dual channel FADEC system that are needed for "normal" mode operation ($\lambda_{TLD}$). In the single channel operating mode identified above, $\lambda_{TLD}$=209.2 (i.e., 206.9+2.3=209.2) fpmh.

If for example, the FADEC system is operating in the dual channel mode with the cross channel communication intact, but NH(A) has failed, the switches would be positioned as shown in FIGS. 6a–6b. More specifically, 342a, 348 and 350 are closed. If any sensor or effector in channel A or B fails, switch 348 closes. If any channel A component fails, switch 348 and 350 close and if any B component fails, switch 348 and 352 close. If any individual sensor or effector fails in channel A or B, the switch that represents that component closes. The individual sensor/effector switches in the dual channel operating mode are identified as switches 342a through 342v.

Consistent with failure matrix 200, if NH(A) has failed, in order to continue operating in the normal mode, cross channel communication must be intact, the redundant component NH(B) must be operational, and the computer (CPU) and power supply for channel B must be online. Therefore, a signal representing the failure rate of NH(B), namely 11 fpmh, is provided to summing circuit 344. Since all of the other components are healthy, the total failure rate at summing circuit 344 is 11 fpmh. The signal representing the failure rate of NH(B) is provided to summing junction 346 and is combined with a signal representing the total failure rate for the remaining components required for continued operation in the normal mode (i.e., the power supply, microcomputer, and XCHAN data link). The total failure rate for the remaining components is 23.9 fpmh and therefore the output signal from summing junction 346 represents a combined rate of 34.9 fpmh.

Since switch 352 is in the open position only the output of summing junction 346 is provided to summing junction 354. The output from summing junction 354 represents the dual channel failure rate $\lambda_{TLD.dual}$, which in this example would be 34.9 fpmh. In this operating example, the XCHAN data link and both channels A and B are operational. Therefore, switch 324 remains closed and a signal $\lambda_{TLD.dual}$ is provided to summing junction 326 and added with signals representing the uncovered fault failure rate ($\lambda_{UC}$) and the failure rate for the common prime reliable components ($\lambda_{TLD.prime}$). The output of summing junction 326, $\lambda_{TLD}$, is a signal representing 37.2 fpmh.

The above-described failure scenarios are just two of the many possible scenarios and are intended to provide an overview of how failure tree 300 operates. It should be noted that FIGS. 6a–6b, in a similar manner to the previously described figures, provide a representative approach to the failure analysis and those skilled in the art would readily appreciate that essential components can be added to or removed from the list of components considered in the analysis. Additionally, the failure rates can be changed or adjusted based on experience or a desire to provide a more or less conservative fault management system.

Figure 7:
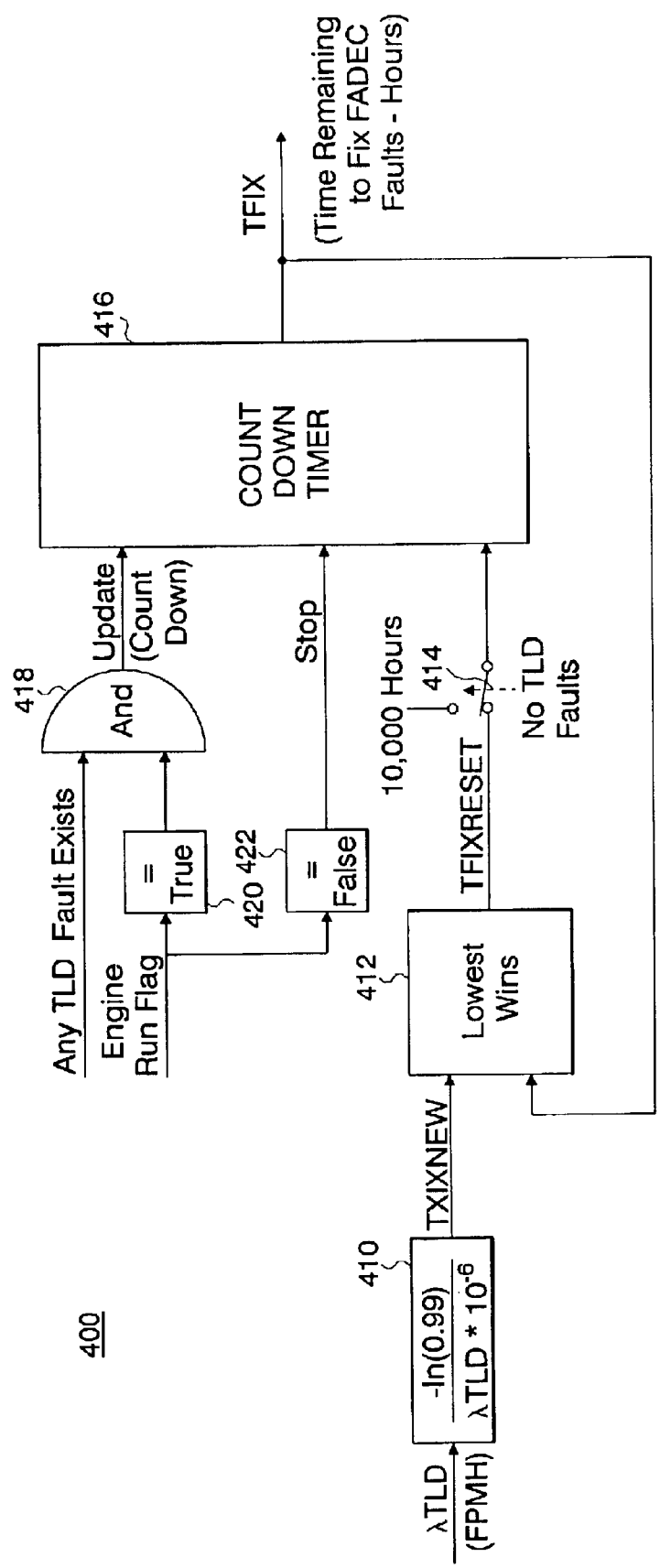
FIG. 7 is a logic diagram illustrating the manner in which the time remaining to fix ($T_{FIX}$) in hours is determined based on the real-time failure rate ($\lambda_{TLD}$)

Referring now to FIG. 7, represented schematically is the manner in which the time remaining to fix ($T_{FIX}$) existing faults in the FADEC system is determined by logic 400. Initially, the output of summing junction 326 (see FIG. 6b), $\lambda_{TLD}$, is provided to converter 410. Converter 410 applies the following equation to determine a new or initial time remaining to fix ($T_{FIXNEW}$) the FADEC system fault(s):

$$-\ln(0.99)/[\lambda_{TLD}*10^{-6}]=T_{FIXNEW}$$

$T_{FIXNEW}$ is calculated every time $\lambda_{TLD}$ changes value, i.e., every time a new FADEC system fault occurs. The 0.99 represents a 99% probability that the FADEC system can get through the computed time period without degrading below the "normal" mode of operation for the given failure rate. This probability can be adjusted as desired to increase or reduce the conservatism in the calculations or predictions.

As an example of the representative operation of logic 400, assuming that NH(A) has failed and therefore, $\lambda_{TLD}$ equals 37.2 fpmh, the output of converter 410 or $T_{FIXNEW}$ would be a signal representing 270 hours. This signal is provided to auctioning logic 412 and is compared to a previously calculated time remaining to fix ($T_{FIX}$). The lower of the two values becomes the "reset" time remaining to fix the existing faults ($T_{FIXRESET}$). If the failure of NH(A) is the first fault encountered by the FADEC system, switch 414 was in the open position prior to the failure and the default initial count down time setting for the engine is 10,000 hours. $T_{FIXNEW}$ is compared to a $T_{FIX}$ which equals the initial 10,000 hours minus the operating time according to the countdown timer.

Countdown timer 416 tracks the amount of operational time that has elapsed since the last calculation of $T_{FIXRESET}$. The output of countdown timer 416 is $T_{FIX}$ which represents $T_{FIXRESET}$ minus the amount of running time. The countdown timer is updated every second, and $T_{FIX}$ is stored in volatile memory every minute. The countdown timer 416 is reset continually for fault free conditions and to $T_{FIXRESET}$ at the instant a new fault is encountered. If a FADEC system fault is encountered and the engine is running, logic gates 418 and 420 signal the countdown timer 416 to operate. However, if the engine is not operating, the logic gate 422 stops countdown timer 416.

When a new FADEC system fault occurs, $T_{FIX}$ is cycled back to auctioning circuit 412 and compared to the new $T_{FIXNEW}$. It should be noted that switch 414 remains in the open position until a FADEC system fault is encountered.

Figure 8A:
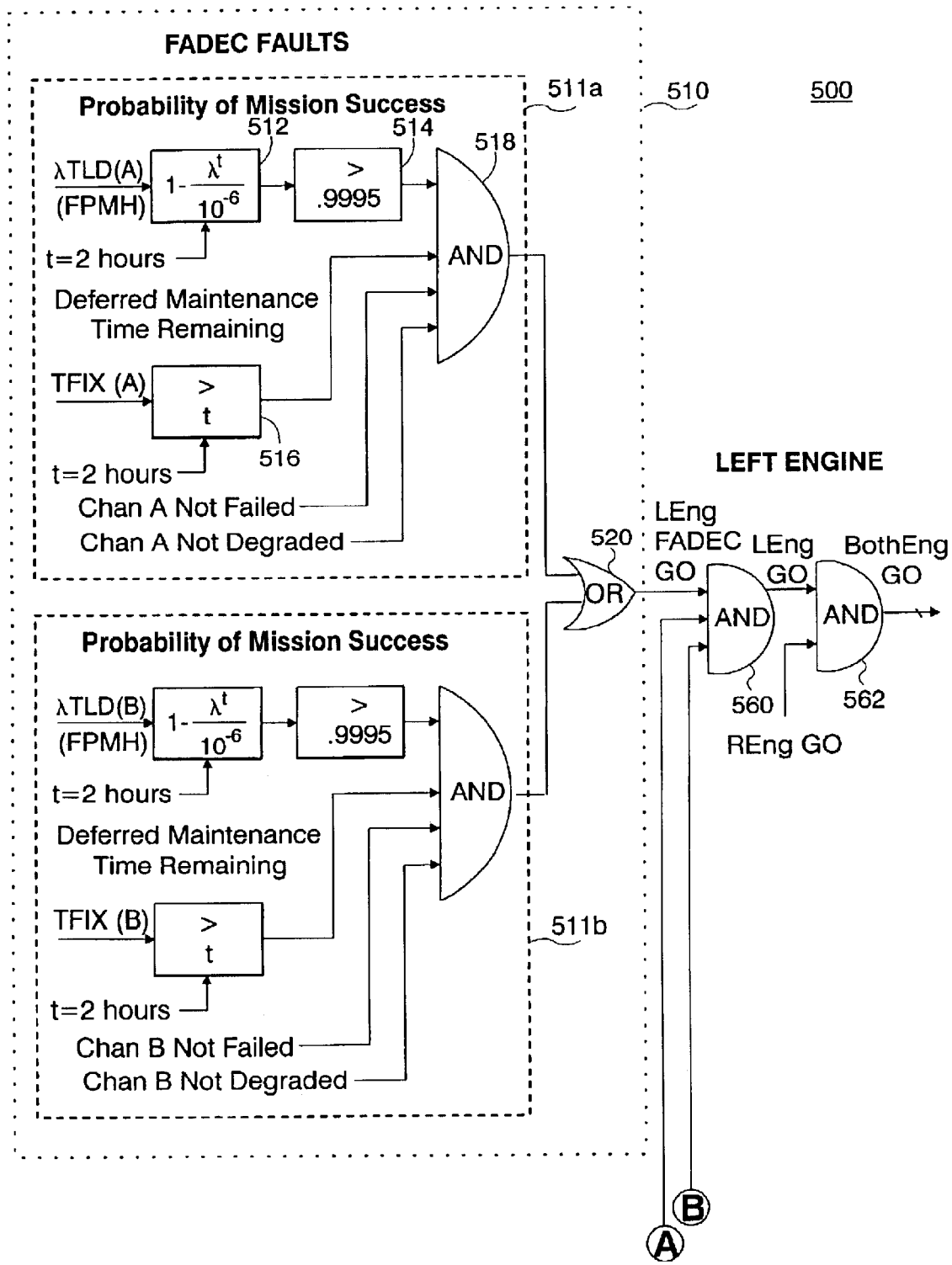
FIGS. 8a–8b provide a logic diagram of the fault management system of the present disclosure wherein input signals are received from a FADEC fault detection component, an engine vibration component and an engine exceedance component and are used to determine if both the left and right engines are cleared for dispatch.
Figure 8B:
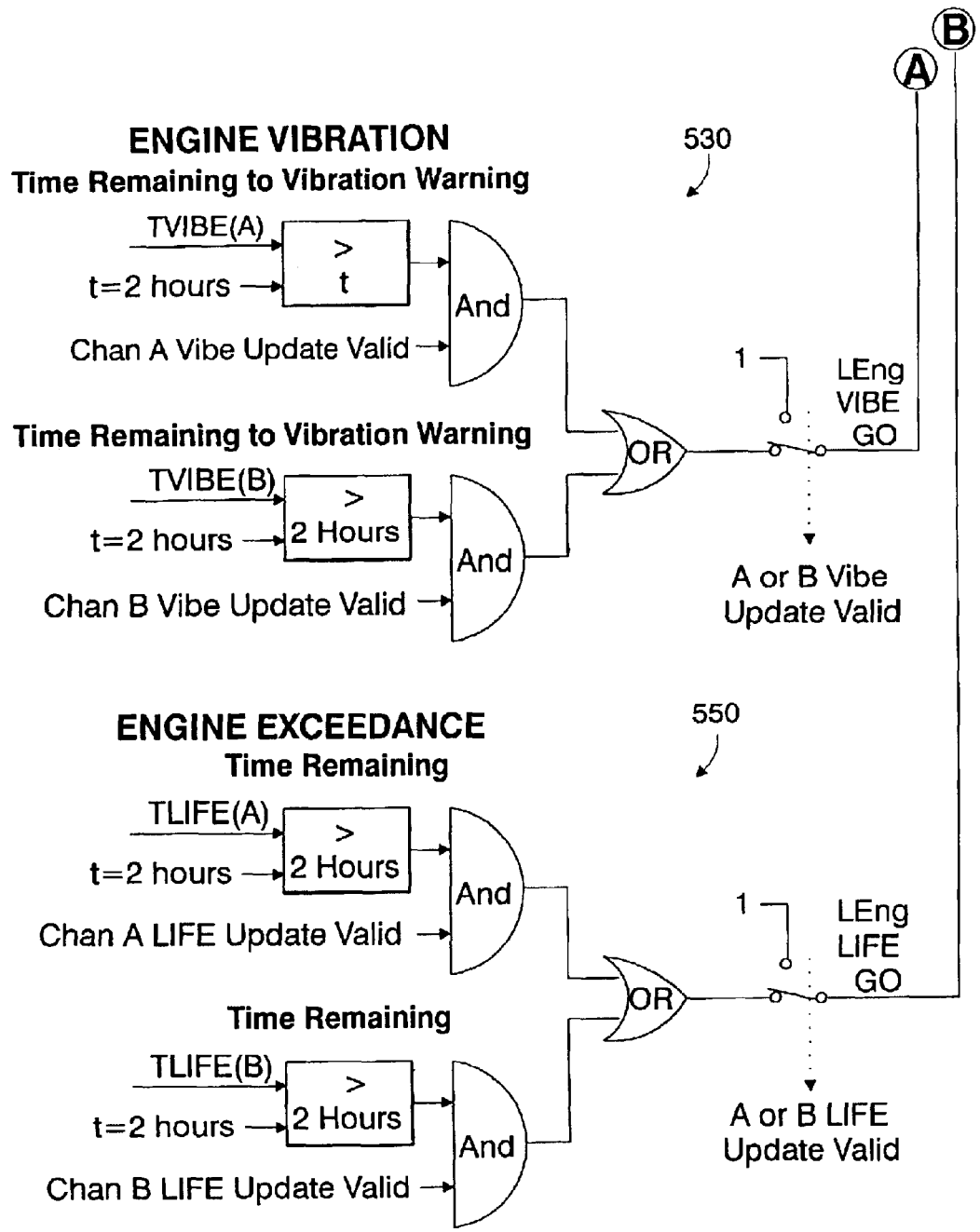

Referring now to FIGS. 8a–8b, there is illustrated a fault management system for a dual engine aircraft designated generally as reference numeral 500. Fault management system 500 includes, among other things, a left engine FADEC system fault predictor 510, a left engine vibration fault predictor 530 and a left engine exceedance fault predictor 550. Similar elements are provided for the right engine but are not shown. The left engine FADEC fault predictor 510 and the fault management approach for essential components identified with respect to FIGS. 1–7 is the subject of the present application. The engine vibration predictor 530 and exceedance fault predictor 550 are representative of other failure inputs that can be included in determining engine suitability for a predetermined operational period. The determination of these inputs is not the subject of this application and will not be described hereinbelow, as it is not necessary to an understanding of the present invention.

FADEC fault predictor 510 receives input signals from failure tree 300 and logic 400, namely the inputs of $\lambda_{TLD}$ and $T_{FIX}$, respectively. Either or both logic circuits 511a and 511b are accessed depending on the operational status of the channels, to determine if the left engine is capable of satisfying the operational criteria.

Assuming that channel A is capable, $\lambda_{TLD}$ is provided to converter 512 which applies the following formula to determine the probability of mission success:

$$1-(\lambda^t/1*10^6)=\text{probability of mission success}$$

Where "t" is set at 2 hours

The resulting signal, representing the probability of mission success, must be greater than 0.9995 in order to satisfy the criteria of logic gate 514. Additionally, the $T_{FIX}$ provided from logic 400 must be greater than "t" or 2 hours in order to satisfy the criteria of logic gate 516. If the criteria of both gates 514 and 516 are satisfied, since channel A has not failed and is not degraded then gate 518 is also satisfied and the left engine FADEC system is a go. If channel B is capable, then circuitry 511*b* is accessed and in a same manner evaluates the probability of mission success and the deferred maintenance time remaining.

In order for the left engine to be considered capable of performing the intended mission, logic gate 560 requires that the criteria established by the engine vibration predictor 530 and the exceedance fault predictor 550 also are satisfied. The evaluation of the right engine is conducted in a similar manner. If both engines satisfy the fault management criteria, a signal is sent from logic gate 562 indicating that both engines are a go or capable of operating in the normal mode for the entire mission.

Figure 9:
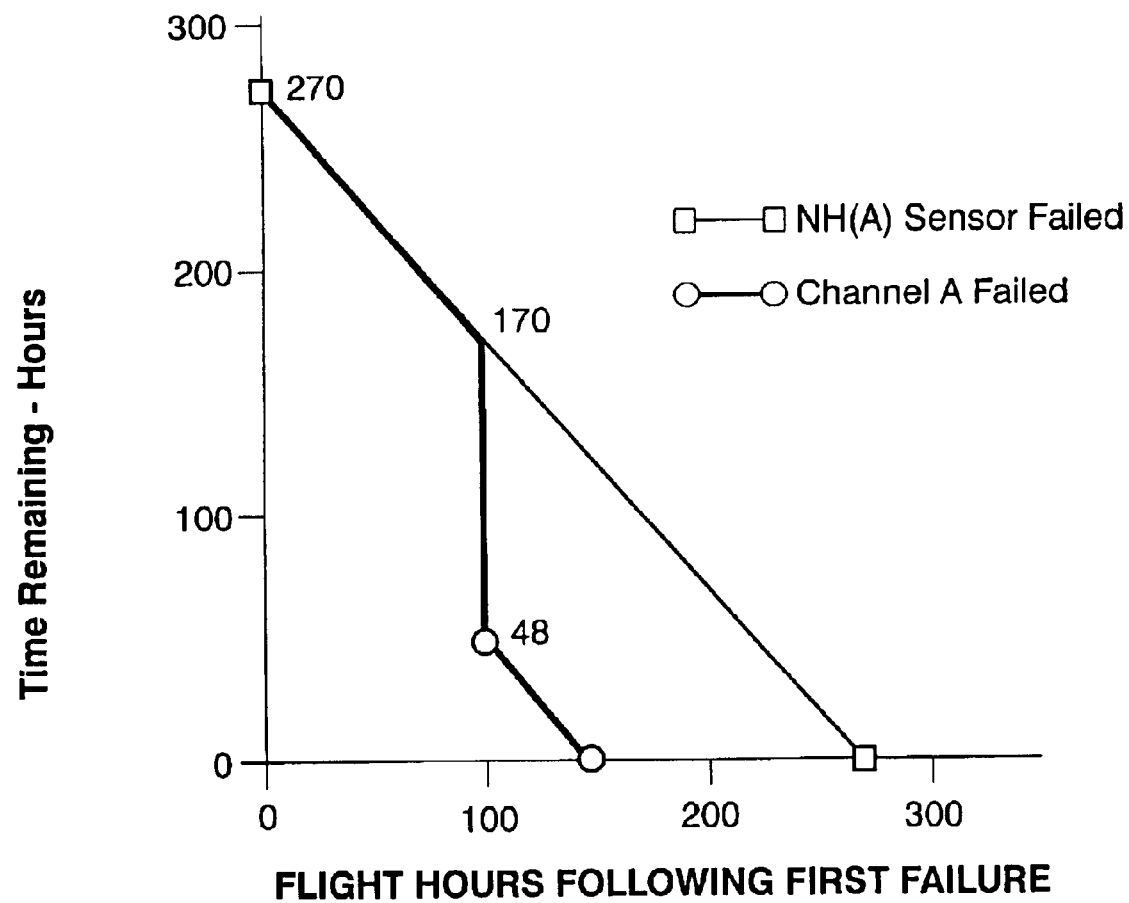
FIG. 9 is a graph comparing the time remaining before maintenance is required to the flight hours following first partial failure of the FADEC system on one of the two engines.

Referring now to FIG. 9, there is illustrated a graphical representation of the time remaining to fix existing faults in the FADEC system of one engine versus the flight hours following the first component failure. This graph illustrates an operational scenario wherein an initial failure occurred in the channel A high pressure turbine spool speed sensor (NH(A)) and after 100 hours of operation in the initial fault mode channel A failed. As described with respect to FIGS. 6 and 7, a failure of the NH(A) sensor results in a $\lambda_{TLD}$ of 37.2 and a $T_{FIX}$ of 270 hours. Therefore, the initial data point on the graph represents a time remaining to fix of 270 hours and zero hours following the failure of the NH(A) sensor. After 100 hours of operation, channel A fails and a new time remaining to fix is calculated based on the fault management approach described in FIGS. 4 through 7. The failure of channel A results in a new $\lambda_{TLD}$ of 209.2 and a $T_{FIX}$ of 48 hours. Therefore, the fault management system disclosed herein predicts that there is a 99% probability that the aircraft can operate with the existing faults in the FADEC system for another 48 hours before maintenance is required. As discussed with respect to FIG. 7, the 99% probability is based on converter 410 and can be adjusted to a desired probability.

Figure 10:
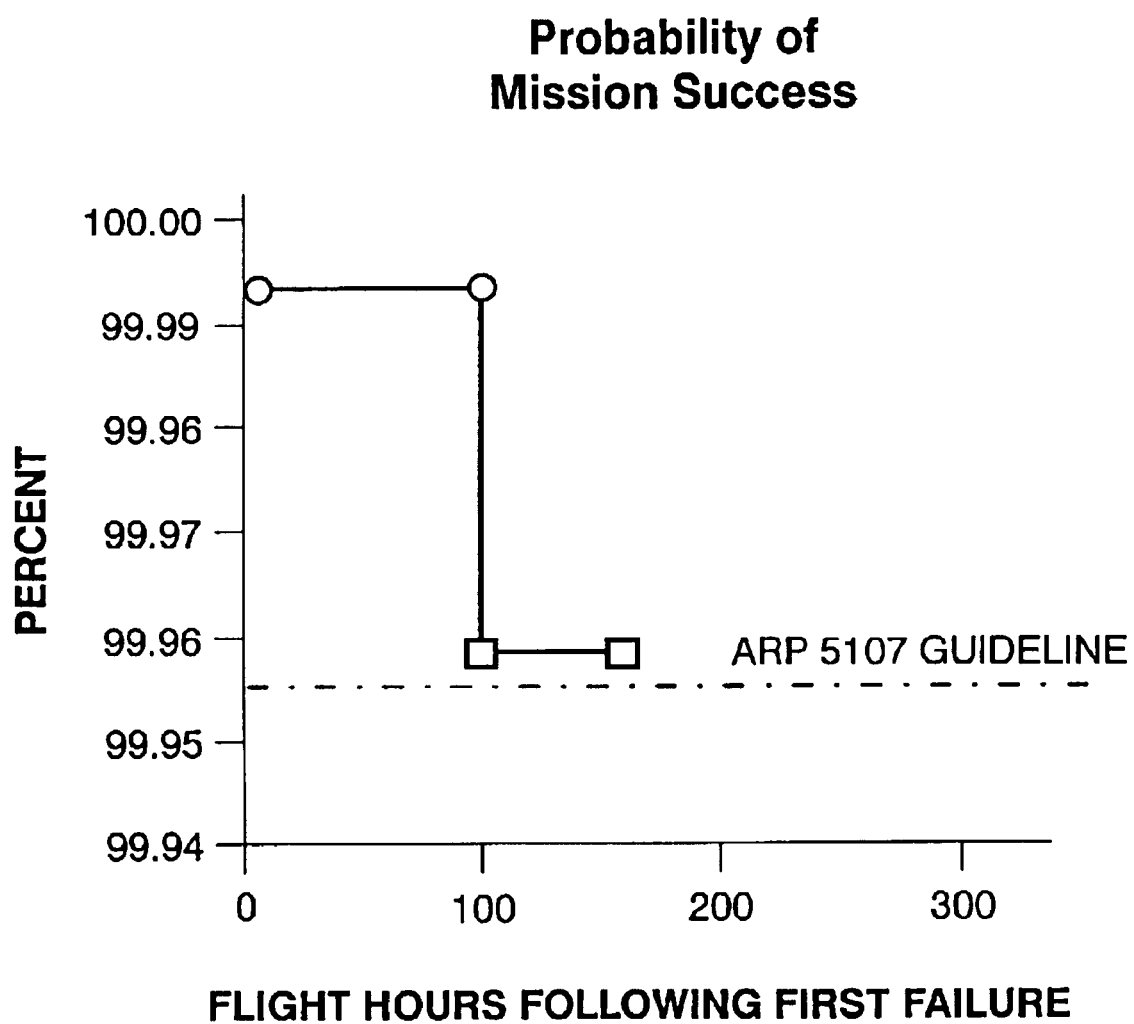
FIG. 10 is a graph depicting the probability of not operating in the normal mode during a two hour mission.

Referring now to FIG. 10, there is provided a graph that illustrates the probability (in percent) of operating in the normal mode during a 2 hour mission based on the operating scenario discussed in FIG. 9. After a first failure of the NH(A) sensor, resulting in a $\lambda_{TLD(A)}$ of 37.2 fpmh, the probability of mission failure based on converter 512 (FIG. 8*a*) is 0.007% and therefore, the probability of mission success is 99.993%. After a 100 hours of operation with the existing failure of the NH(A) sensor, channel A fails and a new probability of failure and success are 0.0438% and 99.956%, respectively, based on a $\lambda_{TLD}$ of 209.2 fpmh.

FIG. 10 also compares the results of the fault management approach disclosed herein to the criteria or guidelines specified in SAE ARP 5107. As shown, the fault management approach disclosed herein provides an approach which is within the guidelines provided in ARP 5107.

While the invention has been described with respect to preferred embodiments, those skilled in the art will readily appreciate that various changes and/or modifications can be made to the invention without departing from the spirit or scope of the invention as defined by the appended claims.

What is claimed is:

1. A fault management method for a dual channel electronic engine control system, the method comprising the steps of:
    a) providing an electronic engine control system having a first channel and a second channel, wherein each of the first and second channels have a plurality of components associated therewith each having a predicted failure rate, the components in the second channel being substantially identical to the components in the first channel;
    b) designating, for each of the plurality of components in the first channel, which of the plurality of components in the second channel are single thread components required to cover a failure of that particular first channel component;
    c) detecting whether any one of the plurality of components in the first channel have failed;
    d) estimating a total failure rate based on the failure rates for all of the single thread components required to cover any failed components; and
    e) predicting the time remaining to fix the electronic control system faults based on the total failure rate.

2. A fault management method as recited in claim 1, wherein the step of estimating a total failure rate based on the failure rates for all of the single thread components includes summing the failure rates for all of the single thread components and failure rates for common prime reliable components.

3. A fault management method as recited in claim 1, wherein the step of predicting the time remaining to fix the electronic control system faults based on the total failure rate includes the step of assigning a desired probability for maintaining normal engine control.

4. A fault management method as recited in claim 1, further comprising the steps of:
    a) establishing an estimated mission length;
    b) comparing the estimated mission length to the predicted time remaining to fix the system faults; and
    g) providing an go/no-go signal based on the comparison of the time remaining to fix the electronic control system faults to estimated mission length.

5. A fault management method as recited in claim 1, further comprising the steps of:
    a) detecting whether any of single thread components in the second channel have failed; and
    b) providing a no-go signal if a single thread component in the second channel has failed.

6. A fault management method as recited in claim 1, further comprising the steps of:
    a) estimating a probability of mission success based on the total failure rate;
    b) assigning a minimum probability of success for the mission; and
    c) providing a no-go signal if the estimated probability of mission success does not exceed the assigned minimum probability of success.

7. A fault management method as recited in claim 1, wherein prior to the step of predicting based on the total failure rate the time remaining to fix the electronic control system faults, the method further comprises the steps of:
    a) designating for each of the plurality of components in the second channel which of the plurality of components in the first channel are single thread components required to cover a failure of that particular second channel component and maintain normal engine control;
    b) detecting which of the plurality of components in the second channel have failed; and
    c) estimating the total failure rate based on the failure rates for all of the single thread components in the first and second channels which are required to cover the failed first and second channel components.

8. A fault management method as recited in claim 1, wherein the steps of detecting which of the plurality of components in the first channel have failed; estimating a total failure rate based on the failure rates for all of the single thread components in the second channel which are required to cover the failed first channel component; and predicting based on the total failure rate the time remaining to fix the electronic control system faults are preformed iteratively.

9. A fault management model for a dual channel electronic engine control system, the model comprising:
   a) an electronic engine control system having a first channel and a second channel, wherein the first and second channels have a plurality of components associated therewith each having an assigned failure rate, the components in the second channel being substantially identical to the components in the first channel;
   b) means for designating for each of the plurality of components in the first channel which of the plurality of components in the second channel are single thread components required to cover a failure of that particular first channel component;
   c) means for detecting whether any of the plurality of components in the first channel have failed;
   d) means for estimating a total failure rate based on the failure rates for all of the single thread components required to cover any failed components; and
   e) means for predicting the time remaining to fix the electronic control system faults based on the total failure rate.

10. A fault management model as recited in claim 1, wherein the means for estimating a total failure rate based on the failure rates for all of the single thread components includes means for summing the failure rates for all of the single thread components and failure rates for common prime reliable components.

11. A fault management model as recited in claim 1, wherein the means for predicting based on the total failure rate the time remaining to fix the electronic control system faults includes means for assigning a desired probability for maintaining normal engine control.

12. A fault management model as recited in claim 1, further comprising:
   a) means for establishing an estimated mission length;
   b) means for comparing the estimated mission length to the predicted time remaining to fix the system faults; and
   c) means for providing a go/no-go signal based on the comparison of the time remaining to fix the electronic control system faults to estimated mission length.

13. A fault management model as recited in claim 1, further comprising:
   a) means for detecting whether any of the single thread components in the second channel have failed; and
   b) means for providing a no-go signal if a single thread component in the second channel has failed.

14. A fault management model as recited in claim 1, further comprising:
   a) means for estimating a probability of mission success based on the total failure rate;
   b) means for assigning a minimum probability of success for the mission; and
   c) means for providing a no-go signal if the estimated probability of mission success does not exceed the assigned minimum probability of success.

15. A fault management model as recited in claim 1, further comprising:
   a) means for designating for each of the plurality of components in the second channel which of the plurality of components in the first channel are single thread components required to cover a failure of that particular second channel component;
   b) means for detecting whether any of the plurality of components in the second channel have failed; and
   e) means for estimating the total failure rate based on the failure rates for all of the single thread components in the first and second channels which are required to cover the failed first and second channel components.

16. A fault management method for electronic engine control systems, the method comprising the steps of:
   a) providing an electronic engine control system having a first plurality of components for normal engine control and second plurality of components which are substantially redundant to the first plurality of components, each of the first and second plurality of components having an assigned failure rate;
   b) designating for each of the first plurality of components which of the second plurality of components are single thread components required to cover a failure of that particular first component;
   c) iteratively detecting whether any of the first plurality of components have failed;
   d) iteratively estimating a total failure rate based on the failure rates for all of the single thread components required to cover the failed first plurality of components; and
   e) iteratively predicting the time remaining to fix the electronic control system failure based on the total failure rate.

17. A fault management method as recited in claim 1, wherein the step of iteratively estimating a total failure rate based on the failure rates for all of the single thread components includes summing the failure rates for all of the single thread components and failure rates for common prime reliable components.

18. A fault management method as recited in claim 1, wherein the step of iteratively predicting the time remaining to fix the electronic control system failures based on the total failure rate includes the step of assigning a desired probability for maintaining normal engine control.

19. A fault management method as recited in claim 1, further comprising the steps of:
   a) establishing an estimated mission length;
   b) comparing the estimated mission length to the iteratively predicted time remaining to fix the system failures; and
   c) providing an go/no-go signal based on the comparison of the time remaining to fix the electronic control system failures to estimated mission length.

20. A fault management method as recited in claim 1, further comprising the steps of:
   a) detecting whether any of the single thread components in the second plurality of components have failed; and
   b) providing a no-go signal if any single thread component in the second plurality of components has failed.

21. A fault management method as recited in claim 1, further comprising the steps of:
   a) estimating a probability of mission success based on the total failure rate;
   b) assigning a minimum probability of success for the mission; and
   c) providing a no-go signal if the estimated probability of mission success does not exceed the assigned minimum probability of success.

22. A fault management method as recited in claim 1, wherein prior to the step of predicting based on the total failure rate the time remaining to fix the electronic control system failures, the method further comprises the steps of:

a) designating for each of the second plurality of components which of the first plurality of components are single thread components that are required to cover a failure of that particular component;

b) detecting whether any of the second plurality of components have failed; and c) estimating the total failure rate based on the failure rates for all of the single thread components required to cover the failed first and second plurality of components.

* * * * *